US012553506B2

(12) United States Patent
Paulson et al.

(10) Patent No.: US 12,553,506 B2
(45) Date of Patent: Feb. 17, 2026

(54) MACHINE ACCESSORY WITH FAN-INTEGRATED COVER

(71) Applicant: CNH Industrial America LLC, New Holland, PA (US)

(72) Inventors: Thomas Paulson, Burr Ridge, IL (US); Benjamin Erickson, Burr Ridge, IL (US); Jason Weyer, Burr Ridge, IL (US); Robert Kost, Burr Ridge, IL (US); Reid Williamschen, Burr Ridge, IL (US); Timothy Hertsgaard, Burr Ridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 352 days.

(21) Appl. No.: 18/295,082

(22) Filed: Apr. 3, 2023

(65) Prior Publication Data

US 2024/0328407 A1 Oct. 3, 2024

(51) Int. Cl.
*F16H 55/36* (2006.01)

(52) U.S. Cl.
CPC .................................... *F16H 55/36* (2013.01)

(58) Field of Classification Search
CPC ........................................................ F16H 55/36
See application file for complete search history.

(56) References Cited

U.S. PATENT DOCUMENTS 4,202,409 A 5/1980 Cann
4,555,239 A * 11/1985 Miranti, Jr. ............. F16H 57/05 474/93
4,793,457 A 12/1988 Siewert et al.
5,795,137 A * 8/1998 Ozawa .................. F04D 29/708 417/362
5,893,706 A 4/1999 Kawaguchi et al.
6,164,929 A 12/2000 Kazuya et al.
7,041,019 B2 5/2006 Matsubara et al.
2004/0224806 A1* 11/2004 Chonan ............... F16H 57/0415 474/93
2015/0247558 A1* 9/2015 Hamers ................... F02B 67/06 474/117
2017/0268655 A1* 9/2017 Stocks ...................... F16H 9/14
2023/0167883 A1* 6/2023 Cariccia ................ F16D 27/118 180/65.21
2024/0247609 A1* 7/2024 Pham ........................ F16H 7/12

FOREIGN PATENT DOCUMENTS

CN 203067222 U 7/2013
CN 212775256 U 3/2021
DE 40 21 002 A1 1/1992
KR 20220040557 A 3/2022

OTHER PUBLICATIONS

CVF Racing Peanut AC Compressor Cover—Serpentine Clutch, accessed in 2022, https://www.cvfracing.com/peanut-ac-compressor-cover-serpentine-clutch/.

* cited by examiner

*Primary Examiner* — Brian L Swenson
(74) *Attorney, Agent, or Firm* — Foley & Lardner LLP

(57) ABSTRACT

An accessory assembly for a machine includes a cover defining a plurality of openings. The cover has a plurality of fins extending therefrom. A portion of the cover is configured to couple to an accessory pulley of an accessory for the machine such that the cover extends over an aperture in a face of the accessory pulley.

19 Claims, 6 Drawing Sheets

MACHINE ACCESSORY WITH FAN-INTEGRATED COVER

BACKGROUND

Machines and vehicles may include clutched accessories that perform various auxiliary functions. However, such clutched accessories can be prone to dust exposure or water ingress that can cause damage or component degradation.

SUMMARY

One embodiment relates to an accessory assembly for a machine. The accessory assembly includes a cover defining a plurality of openings. The cover has a plurality of fins extending therefrom. A portion of the cover is configured to couple to an accessory pulley of an accessory for the machine such that the cover extends over an aperture in a face of the accessory pulley.

Another embodiment relates to a cover for an accessory of a machine. The cover includes a flange configured to couple to a pulley of the accessory, a sidewall extending from the flange, and a faceplate coupled to the sidewall. The cover is configured to extend over an aperture in a face of the pulley. The faceplate defines a plurality of openings that extend radially outward from a central portion of the faceplate toward a peripheral edge of the faceplate in a tapered or triangular shape. The faceplate has a plurality of fins. Each of the plurality of fins extends (a) along and from an edge of a respective one of the plurality of openings at an angle and (b) at least partially across the respective one of the plurality of openings. The plurality of openings are configured to facilitate egress of water from within the pulley through the cover. As the cover rotates, the plurality of fins are configured to generate a first airflow that counteracts a second airflow provided by a fan of the machine to mitigate ingress of debris through the plurality of openings. As the cover rotates, the plurality of fins are configured to generate a pressure differential across the pulley to force or pull water or debris from within the pulley and purge the water or debris therefrom through the plurality of openings.

Still another embodiment relates to a machine. The machine includes a chassis, a cab coupled to the chassis, a hood positioned in front of the cab, a prime mover positioned under the hood, and an accessory drive positioned under the hood. The accessory drive includes a drive pulley coupled to the prime mover, an accessory having a driveshaft, a clutched pulley assembly coupled to the accessory, and a belt. The clutched pulley assembly includes an accessory pulley, a clutch, and a cover. The belt couples the drive pulley to the accessory pulley. The accessory pulley has a first face defining a first aperture, an opposing second face defining a second aperture, and an interior surface extending between the first aperture and the second aperture. The first aperture, the second aperture, and the interior surface cooperatively define an internal bore. The driveshaft extends through the internal bore. The clutch is coupled to the driveshaft and positioned within the internal bore. The clutch is configured to selectively engage the interior surface of the accessory pulley to couple the accessory pulley to the driveshaft. The cover is coupled to the first face of the accessory pulley and extends over the first aperture of the accessory pulley. The cover defines a plurality of openings spaced about the cover. The cover has a plurality of fins. Each of the plurality of fins partially extends over a respective one of the plurality of openings.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a machine or vehicle of the present disclosure includes an accessory drive including at least one accessory. The accessory includes a clutched pulley assembly. The clutched pulley assembly includes a pulley, a clutch disposed within an internal bore of the pulley and coupled to a driveshaft of the accessory, and a cover coupled to a face of the pulley and extending over an opening of the internal bore. The cover defines a plurality of openings and have a plurality of fins (e.g., fan blades) extending therefrom. The cover and the openings and the fins thereof provide various advantages including mitigating debris exposure for the clutched pulley assembly, facilitating the egress of water from the clutched pulley assembly (e.g., to mitigate a freezing condition), and providing debris and/or water purging functionality.

Overall Vehicle

Figure 1:
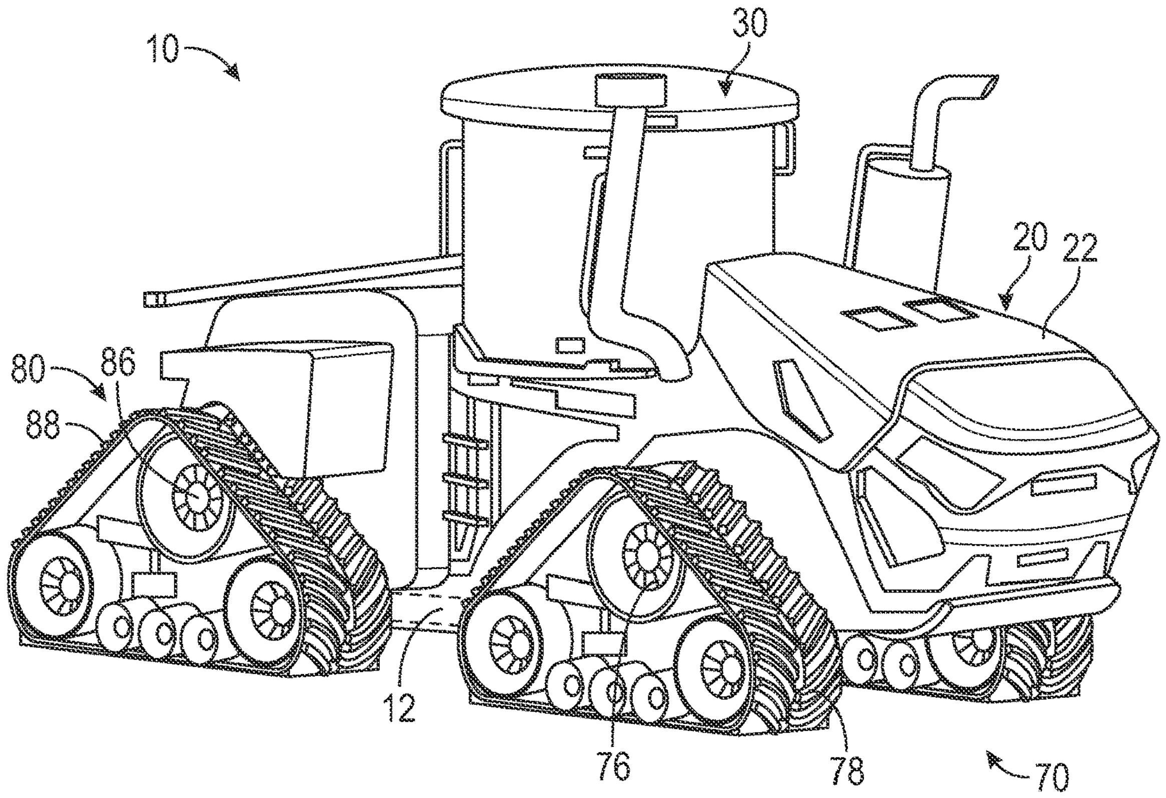
FIG. 1 is a perspective view of a vehicle, according to an exemplary embodiment.
Figure 2:
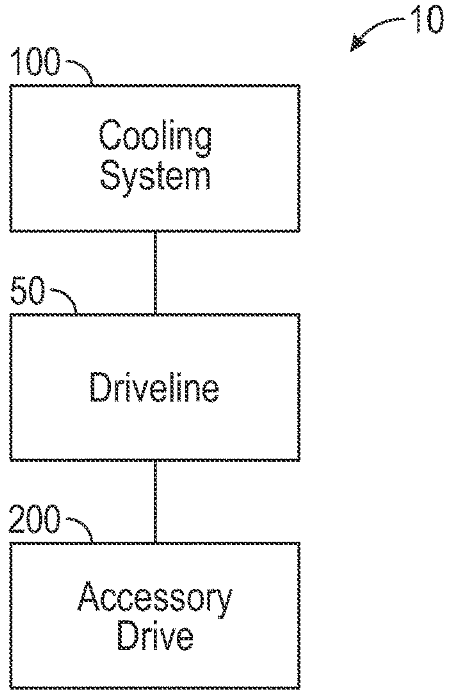
FIG. 2 is a schematic block diagram of the vehicle of FIG. 1, according to an exemplary embodiment.
Figure 3:
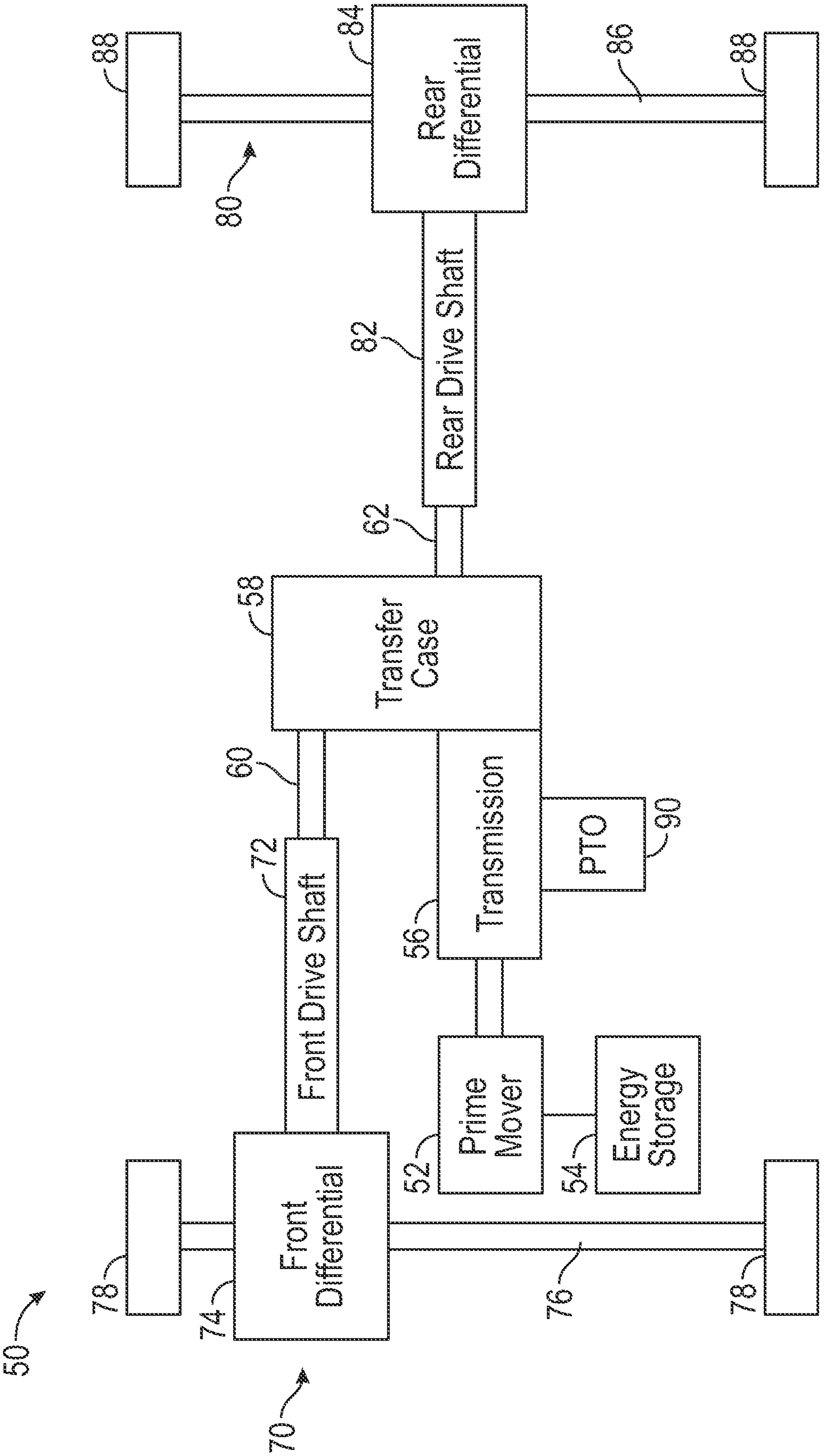
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having a hood, shown as hood 22, and an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle cooling assembly, shown as cooling system 100, disposed under the body 20 (e.g., under the hood 22 thereof) and configured to facilitate cooling one or more components of the vehicle 10 (e.g., an engine, etc.); and an accessory system, shown as accessory drive 200 (e.g., positioned under the hood 22). In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input devices may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52 (e.g., positioned under the hood 22), and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as track elements. In other embodiments, the front tractive elements 78 and the rear tractive elements 88 are otherwise structured (e.g., wheels, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover 52 that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover 52 that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving the accessory drive 200. In some embodiments, the PTO 90, or a second PTO, is additionally or alternatively configured to facilitate driving an attached implement and/or a trailed implement of the vehicle 10. In some embodiments, the driveline 50 includes a PTO clutch positioned to selectively decouple the driveline 50 from the accessory drive 200, the attached implement, and/or the trailed implement of the vehicle 10 (e.g., so that the accessory drive 200, the attached implement, and/or the trailed implement is only operated when desired, etc.).

According to an exemplary embodiment, the vehicle 10 includes a braking system that includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Cooling System and Accessory Drive

Figure 4:
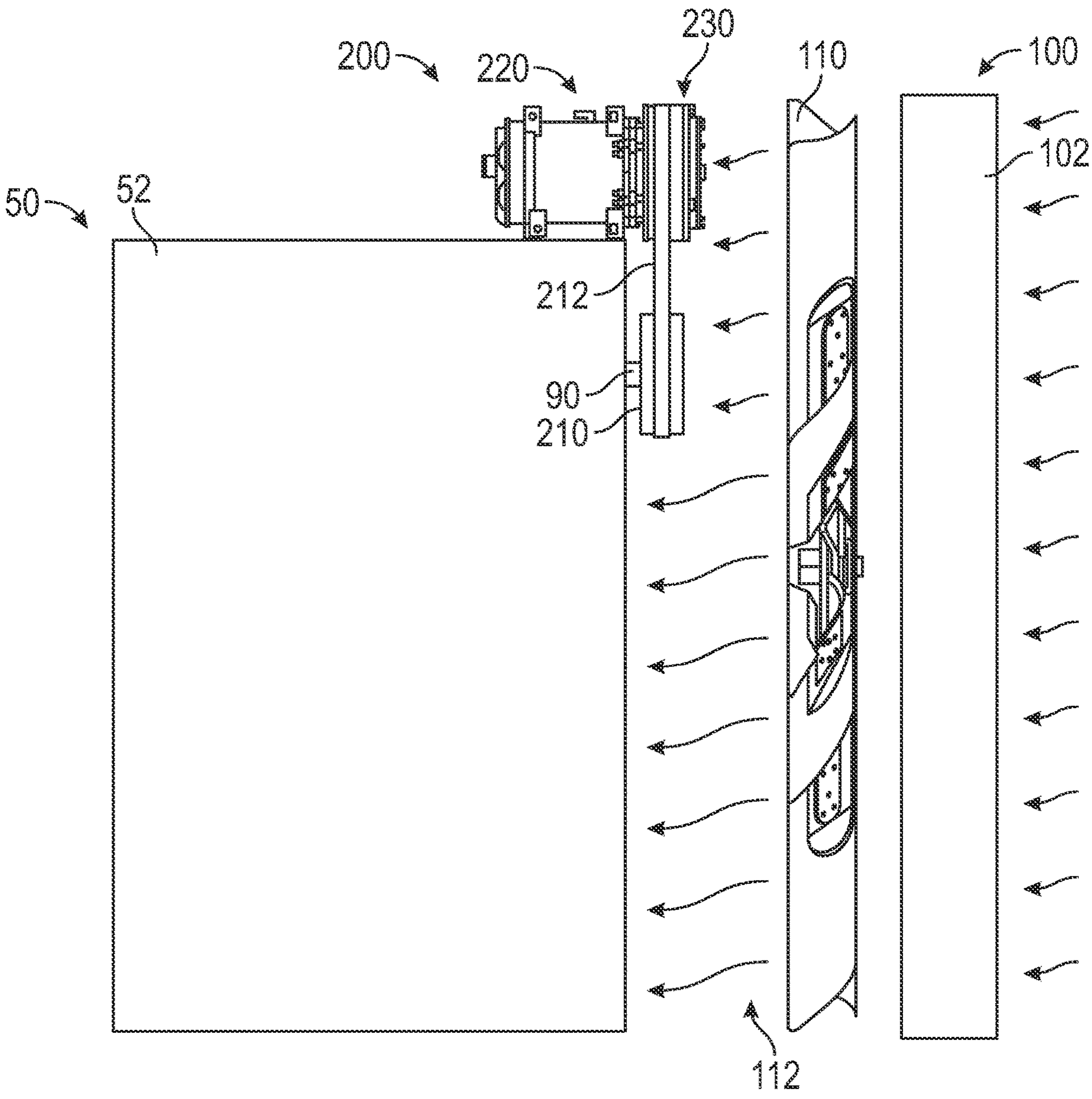
FIG. 4 is a detailed view of a cooling system and accessory drive of the vehicle of FIG. 1, according to an exemplary embodiment.

As shown in FIG. 4, the cooling system 100 is positioned in front or forward of the prime mover 52 of the driveline 50 and the accessory drive 200. The cooling system 100 includes (a) one or more heat exchangers, shown as cooling pack 102, and (b) an air driver, shown as fan 110. According to an exemplary embodiment, the fan 110 is positioned to drive air, shown as airflow 112, through the cooling pack 102 (e.g., heat exchangers thereof such as an engine radiator, a fuel cooler, an oil cooler, an air conditioning condenser, a charge air cooler, etc.) to facilitate thermally regulating or cooling components of the vehicle 10 and/or the driveline 50 (e.g., air conditioning, fuel, oil, the prime mover 52, air flowing into/out of a turbocharger, etc.).

In some embodiments, the cooling system 100 includes a fan driver (e.g., an electric motor) that is independent of the prime mover 52 and drives the fan 110 to force or drive (e.g., pull, push, etc.) the airflow 112 through the various cooling components of the cooling pack 102 and towards the prime mover 52 and the accessory drive 200. In some embodiments, the fan driver is not independent of the prime mover 52, but rather, the fan driver is driven by the prime mover 52. By way of example, the fan driver may be a pneumatically-operated motor or a hydraulically-operated motor coupled to a pneumatic pump or a hydraulic pump, respectively, that is driven by the prime mover 52. In other embodiments, the vehicle 10 does not include the fan driver, but instead the fan 110 is mechanically driven by the prime mover 52 (e.g., through the PTO 90, through a pulley assembly coupled to the PTO 90, etc.).

As shown in FIG. 4, the fan 110 is positioned between (a) the prime mover 52 and the accessory drive 200 and (b) the cooling pack 102 such that the fan 110 is configured to pull the airflow 112 through the cooling pack 102 and push the airflow 112 towards the prime mover 52 and the accessory drive 200. In some embodiments, the fan 110 is positioned proximate a front of the hood 22 and in front of the cooling pack 102 such that the fan 110 is configured to push the airflow 112 through the cooling pack 102 and towards the prime mover 52 and the accessory drive 200.

As shown in FIG. 4, the accessory drive 200 includes (a) a first or main pulley, shown as drive pulley 210, (b) a machine accessory, shown as accessory 220, having a pulley mechanism, shown as clutched pulley assembly 230, coupled thereto, and (c) a connector (e.g., a chain, a belt, a geartrain, etc.), shown as pulley belt 212, coupling the drive pulley 210 to the clutched pulley assembly 230 of the accessory 220. According to the exemplary embodiment shown in FIG. 4, the drive pulley 210 is coupled to the PTO 90 of the prime mover 52 and, thereby, the drive pulley 210 is driven by the prime mover 52. In other embodiments, the drive pulley 210 is coupled to an accessory driver (e.g., an electric motor, an accessory engine, etc.) that is independent of the prime mover 52.

Figure 5:
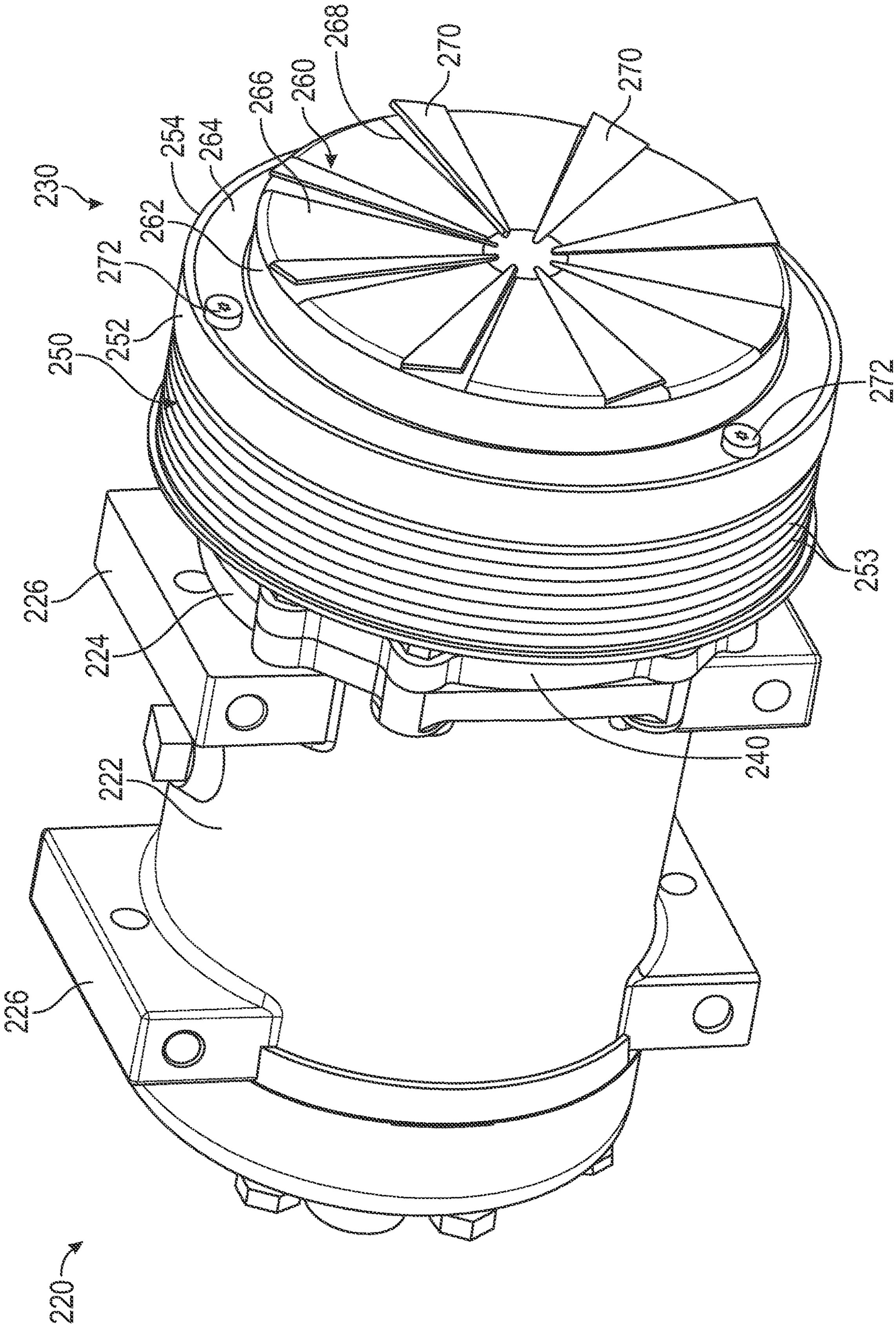
FIG. 5 is a perspective view of an accessory of the accessory drive of FIG. 4, according to an exemplary embodiment.
Figure 6:
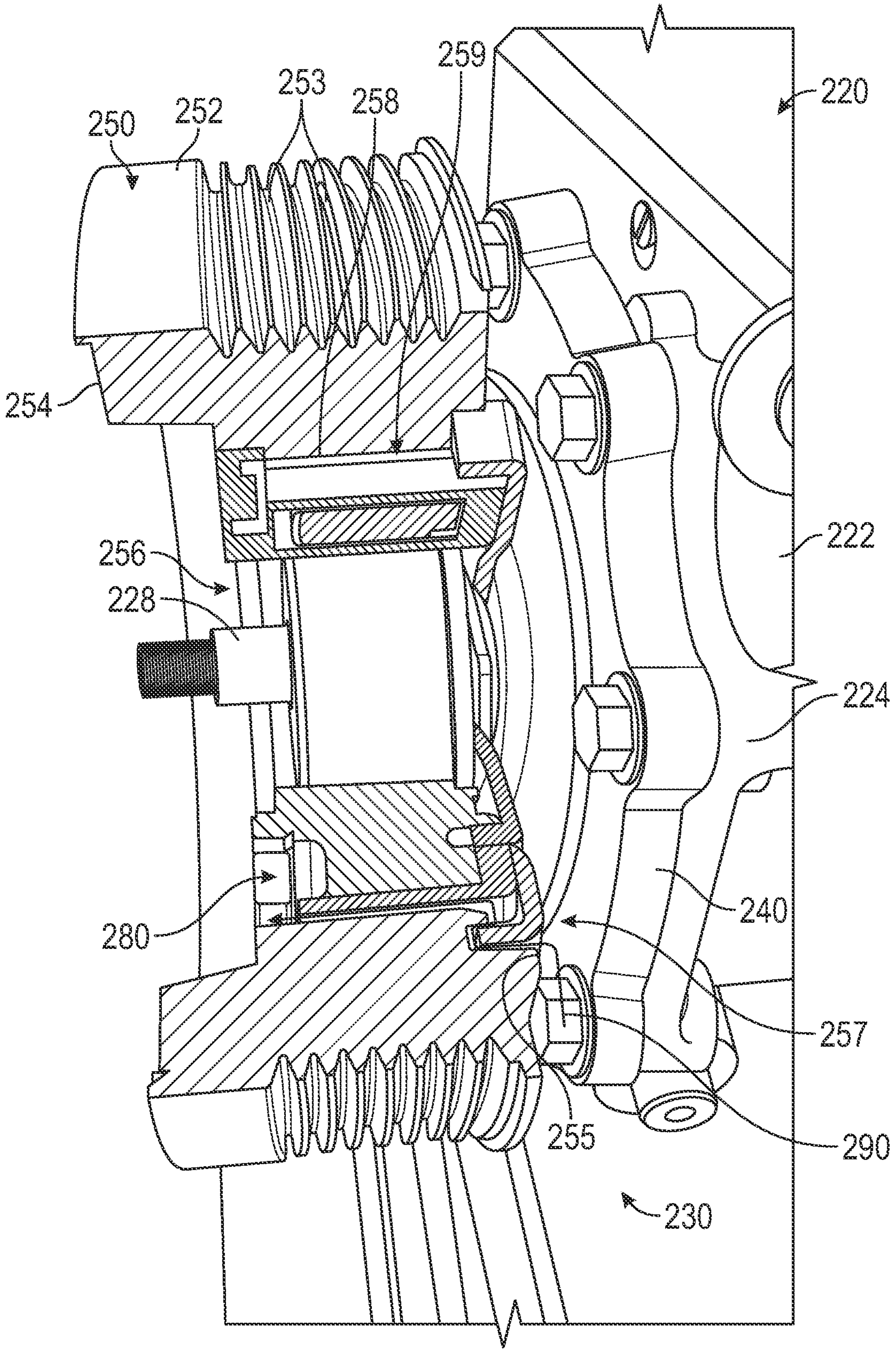
FIG. 6 is a cross-sectional view of a clutched pulley assembly of the accessory of FIG. 5, according to an exemplary embodiment.
Figure 7:
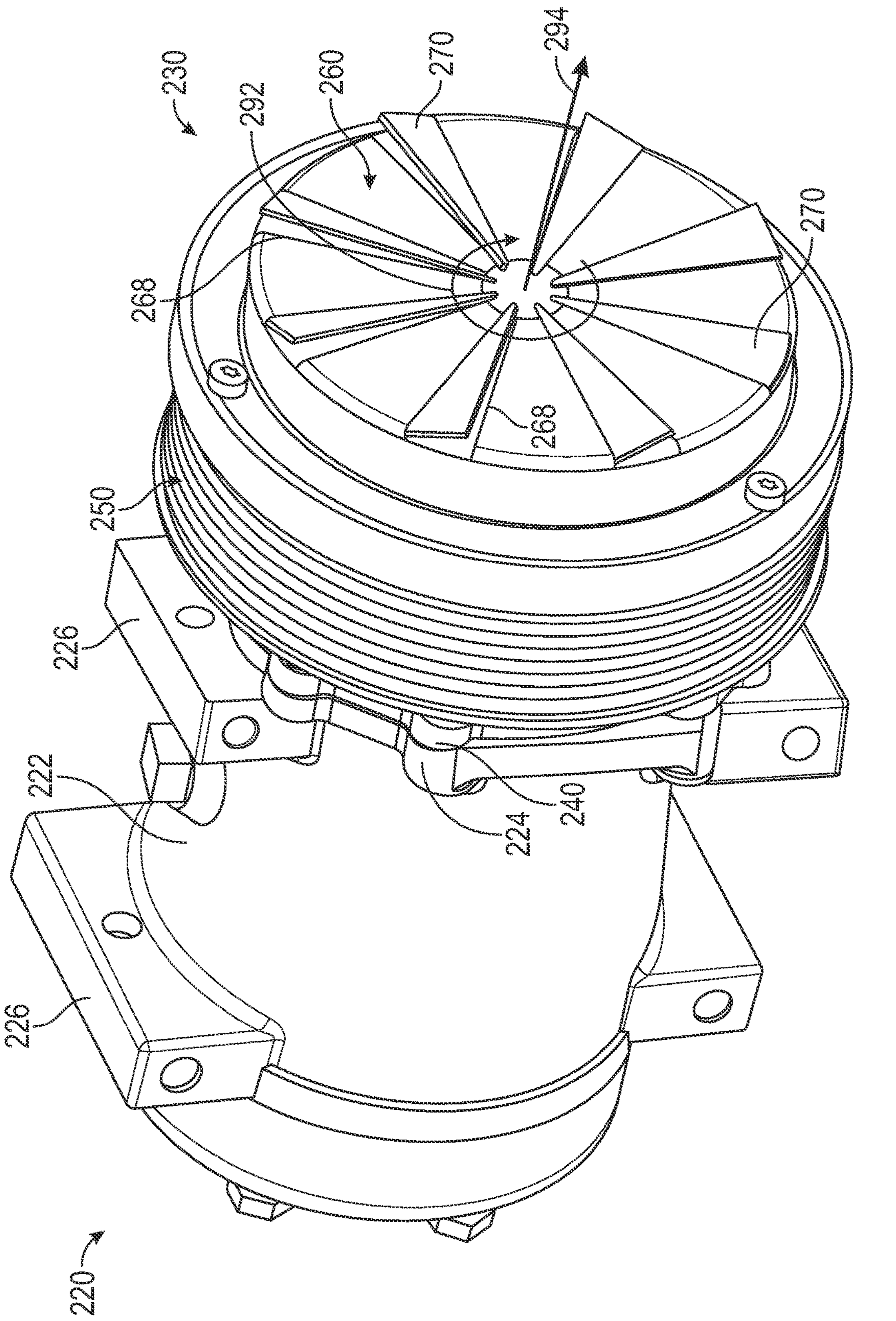
FIG. 7 is a perspective view of the accessory of FIG. 5 in operation, according to an exemplary embodiment.

As shown in FIG. 5-7, the accessory 220 includes a body, shown as accessory housing 222, having a first interface, shown as coupling flange 224, and one or more second interfaces, shown as mounts 226. According to an exemplary embodiment, the mounts 226 are configured to facilitate coupling or mounting the accessory 220 to a support of a component of the vehicle 10 (e.g., a support of the prime mover 52, a frame member, etc.). As shown in FIG. 6, the accessory 220 includes an input shaft, shown as driveshaft 228, extending from the accessory housing 222, and coupled to and selectively driven (e.g., by the prime mover 52, by the independent accessory driver, etc.) through the clutched pulley assembly 230. According to an exemplary embodiment, the accessory 220 is configured to perform a designated function (e.g., compress a gas, perform a pumping function, generate electricity, etc.) when the driveshaft 228 is rotated by the clutched pulley assembly 230. In one embodiment, the accessory 220 is an air conditioning ("AC") compressor. In another embodiment, the accessory 220 is an alternator. In still another embodiment, the accessory 220 is an air compressor. In yet another embodiment, the accessory 220 is a water pump. In other embodiments, the accessory 220 is still another type of accessory. In some embodiments, the accessory drive 200 includes a plurality of accessories 220 with a plurality of clutched pulley assemblies 230 coupled to the drive pulley 210 through the pulley belt 212.

As shown in FIGS. 5-7, the clutched pulley assembly 230 includes (a) a mounting interface, shown as mounting flange 240, (b) a second pulley, shown as accessory pulley 250, (c) a cover, shown as pulley cover 260, and (d) a clutch mechanism, shown as clutch 280. According to an exemplary embodiment, the mounting flange 240 is configured to engage with the coupling flange 224 of the accessory housing 222 to couple the clutched pulley assembly 230 to the accessory 220.

As shown in FIGS. 5 and 6, the accessory pulley 250 has an outer peripheral wall or surface, shown as outer surface 252, that defines a plurality of interfaces, shown as grooves 253, along the periphery thereof and along at least a portion of the width of the outer surface 252. According to an exemplary embodiment, the grooves 253 are configured to engage with a corresponding shape of the pulley belt 212. In other embodiments (e.g., in embodiments where a different type of connector than the pulley belt 212 is used), the grooves 253 are replaced with a different type of interfaces (e.g., gear teeth, sprocket teeth, etc.). As shown in FIGS. 5 and 6, the accessory pulley 250 has a first face, shown as front face, positioned at a front end of the outer surface 252, and an opposing second face, shown as rear face 255, positioned at a rear end of the outer surface 252. As shown in FIG. 6, the front face 254 defines a first aperture, shown as front opening 256, and the rear face 255 defines a second aperture, shown as rear opening 257. The accessory pulley 250 has an inner or interior peripheral wall or surface, inner surface 258, extending between the front opening 256 and the rear opening 257. The front opening 256, the rear opening 257, and the inner surface 258 cooperatively define an interior chamber or internal bore, shown as pulley bore 259. The driveshaft 228 of the accessory 220 extends through the rear opening 257, the pulley bore 259, and the front opening 256.

As shown in FIG. 6, the clutch 280 is coupled to the driveshaft 228 and positioned within the pulley bore 259. According to an exemplary embodiment, the clutch 280 is configured to selectively engage the inner surface 258 of the accessory pulley 250 to couple the accessory pulley 250 to the driveshaft 228 and, therefore, facilitate driving the accessory 220 via the prime mover 52 or the independent accessory driver through the drive pulley 210, the pulley belt 212, the accessory pulley 250, and the clutch 280.

As shown in FIGS. 5 and 7, the pulley cover 260 includes a housing having a first portion, shown as cover sidewall 262, with a second portion or a mounting interface, shown as mounting flange 264, extending from a bottom or rear side/end of the cover sidewall 262, and a third portion or front face, shown as cover faceplate 266, positioned at and extending across a top or front side/end of the cover sidewall 262. The mounting flange 264 of the pulley cover 260 interfaces with and couples to the front face 254 of the accessory pulley 250 via a plurality of fasteners (e.g., bolts, screws, etc.), shown as fasteners 272, such that the pulley cover 260 extends over the front opening 256 of the pulley bore 259 of the accessory pulley 250.

As shown in FIGS. 5 and 7, the cover faceplate 266 of the pulley cover 260 (*a*) defines a plurality of apertures (e.g., openings, cuts, slots, fluid drain holes, air vents, etc.), shown as vents 268, spaced about the cover faceplate 266 (e.g., in a circle) and (b) has a plurality of fins or fan elements, shown as fan blades 270, positioned about the cover faceplate 266. Each of the fan blades 270 extends over and at least partially across a respective one of the vents 268. According to an exemplary embodiment, the vents 268 and the fan blades 270 are formed via a stamping process when manufacturing the pulley cover 260. In other embodiments, the fan blades 270 are coupled to the cover faceplate 266 (e.g., welded) after the formation of the vents 268 (e.g., via drilling, cutting, water jet, milling, subtractive manufacturing, etc.).

According to the exemplary embodiment shown in FIGS. 5 and 7, the shape of the fan blades 270 correspond with the shape of the vents 268. More specifically, the vents 268 extend radially outward from a central portion of the cover faceplate 266 to a peripheral edge of the cover faceplate 266 in a tapered or triangular shape, and the fan blades 270 extend along and from one edge of the vents 268 at an outward angle (e.g., 20 degrees, 30 degrees, 35 degrees, 45 degrees, etc.). In some embodiments, the vents 268 and/or the fan blades 270 extend beyond the cover faceplate 266 onto the cover sidewall 262 (e.g., only the vents 268, only the fan blades 270, both the vents 268 and the fan blades 270). In some embodiments, the vents 268 and/or the fan blades 270 are only positioned along the cover sidewall 262. In some embodiments (e.g., where the fan blades 270 are added to the pulley cover 260), the shape of the fan blades 270 is different than the shape of the vents 268 (e.g., triangular vs. circular, triangular vs. rectangular, etc.). In some embodiments, the vents 268 are positioned proximate the peripheral edge of the cover faceplate 266, or extend along the transition or seam between the cover faceplate 266 and the cover sidewall 262, and the fan blades 270 may be the same or similar to as shown. While the fan blades 270 are shown as having a generally straight profile and extending outward from the cover faceplate 266 away from the accessory pulley 260, in some embodiments, the fan blades 270 have a curved profile and/or extend inward from the cover faceplate 266 toward the accessory pulley 250.

As shown in FIG. 6, various gaps and joints exist between the various internal components of the clutched pulley assembly 230 (e.g., between the clutch 280 and the inner surface 258 of the pulley bore 259, etc.) that can define a path, shown as flow path 290, for water and/or debris (e.g., dirt, dust, etc.) to enter the internals of the clutched pulley assembly 230. During freezing conditions, such water can freeze and cause damage to the internals of the accessory 220 (e.g., an anti-rotation feature thereof) and/or the clutched pulley assembly 230 upon startup of the vehicle 10 by freezing or locking components together that would otherwise not be fused together during the initial rotation of the accessory pulley 250 (e.g., where the clutch 280 would otherwise be disengaged). Similarly, such debris can build up within the pulley bore 259 and the clutch 280, which can increase component degradation (e.g., of bearings, of the clutch 280, etc.) and useful life of the clutched pulley assembly 230 and the components thereof. Traditionally, seals are often positioned between components along the flow path 290 in attempts to counteract the ingress of such water and debris. However, even with such seals, water and debris still can enter the clutched pulley assembly 230. To further counteract the negative effects from the ingress of water and debris, one option is to leave the front opening 256 uncovered, which will allow for water to naturally egress through the front opening 256 and mitigate freezing conditions. However, this option leaves the clutched pulley assembly 230 open to the ambient environment and, therefore, debris can quickly enter and accumulate within the clutched pulley assembly 230. Another option is to put a solid cover over the front opening 256 of the accessory pulley 250. However, while this option may prevent the debris ingress issue of the first option (the uncovered option), the solid cover prevents the natural egress of water out of the front opening 256 of the accessory pulley 250 and, therefore, is more prone to the freezing condition.

According to an exemplary embodiment, the pulley cover 260 of the present disclosure addresses the issues of the above-described options, as well as provides additional advantages. First, the vents 268 facilitate the natural egress of water out of clutched pulley assembly 230 that may enter the pulley bore 259 (e.g., along the flow path 290) while the clutch pulley assembly 230 is stationary (e.g., not in use, not rotating, etc.). Second, as shown in FIG. 7, when the accessory pulley 250 is rotated, as indicated by arrow 292, the fan blades 270 of the pulley cover 260 drive air, shown as airflow 294, away from the clutched pulley assembly 230. Accordingly, during operation of the vehicle 10, the airflow 294 will force debris away from the clutched pulley assembly 230 (e.g., thrown up towards the clutched pulley assembly 230 by the front tractive elements 78, forced towards the clutched pulley assembly 230 by the airflow 112 of the fan 110, etc.). Third, even if water and/or debris were to enter the clutched pulley assembly 230 (e.g., through the flow path 290, through the vents 268, during operation of the vehicle 10, while the vehicle 10 is not in operation, etc.), as the pulley cover 260 and the fan blades 270 thereof rotate with the accessory pulley 250, a negative pressure is generated within the pulley bore 259 and behind the pulley cover 260 that creates a pressure differential across the accessory pulley 250 and the pulley cover 260 (e.g., a first pressure proximate the accessory 220 and upstream of the accessory pulley 250, a second pressure within the accessory pulley 250 that is less than the first pressure, and a third pressure external to the accessory pulley 250 and downstream of the pulley cover 260 that is less than the second pressure) to force or pull any water and/or debris from within the clutched pulley assembly 230 and purge the water and/or debris therefrom through the vents 268. Accordingly, the pulley cover 260 increases the longevity of the components of the clutched pulley assembly 230 by mitigating debris exposure, mitigating the freezing condition, and providing debris and/or water purging functionality.

As utilized herein with respect to numerical ranges, the terms “approximately,” “about,” “substantially,” and similar terms generally mean +/−10% of the disclosed values, unless specified otherwise. As utilized herein with respect to structural features (e.g., to describe shape, size, orientation, direction, relative position, etc.), the terms “approximately,” “about,” “substantially,” and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

References herein to the positions of elements (e.g., “top,” “bottom,” “above,” “below”) are merely used to describe the orientation of various elements in the figures. It should be noted that the orientation of various elements may differ according to other exemplary embodiments, and that such variations are intended to be encompassed by the present disclosure.

It is important to note that the construction and arrangement of the vehicle 10 and the systems and components thereof (e.g., the driveline 50, the cooling system 100, the accessory drive 200, etc.) as shown in the various exemplary embodiments is illustrative only. Additionally, any element disclosed in one embodiment may be incorporated or utilized with any other embodiment disclosed herein.

The invention claimed is:

1. An accessory assembly for a machine, the accessory assembly comprising:

a cover defining a plurality of openings, the cover having a plurality of fins extending therefrom;

wherein a portion of the cover is configured to couple to an accessory pulley of an accessory for the machine such that the cover extends over an aperture in a face of the accessory pulley, wherein the plurality of openings are configured to facilitate egress of water from within the accessory pulley through the cover.

2. The accessory assembly of claim 1, wherein, as the cover rotates, the plurality of fins of the cover are configured to generate a pressure differential across the accessory pulley to force or pull water or debris from within the accessory pulley and purge the water or the debris therefrom through the plurality of openings.

3. The accessory assembly of claim 1, wherein, as the cover rotates, the plurality of fins of the cover are configured to generate a first airflow that counteracts a second airflow provided by a fan of the machine to mitigate ingress of debris through the plurality of openings of the cover.

4. The accessory assembly of claim 1, wherein the cover includes a faceplate, a sidewall extending from the faceplate, and a flange extending from the sidewall, and wherein the flange is the portion of the cover that is configured to couple to the accessory pulley.

5. The accessory assembly of claim 4, wherein the plurality of openings are defined by at least one of the faceplate or the sidewall, and wherein the plurality of fins extend from the faceplate at an angle.

6. The accessory assembly of claim 5, wherein the plurality of openings are defined by the faceplate.

7. The accessory assembly of claim 6, wherein the plurality of openings extend radially outward from a central portion of the faceplate toward a peripheral edge of the faceplate in a tapered or triangular shape, and wherein each of the plurality of fins extends (a) along and from an edge of a respective one of the plurality of openings at the angle and (b) at least partially across the respective one of the plurality of openings.

8. The accessory assembly of claim 5, wherein the plurality of openings are defined by the sidewall.

9. The accessory assembly of claim 5, wherein the plurality of openings are defined by the sidewall and the faceplate.

10. The accessory assembly of claim 1, further comprising the accessory pulley.

11. The accessory assembly of claim 10, wherein the aperture is a first aperture and the face is a first face, wherein the accessory pulley has the first face defining the first aperture, an opposing second face defining a second aperture, and an interior surface extending between the first aperture and the second aperture, and wherein the first aperture, the second aperture, and the interior surface cooperatively define an internal bore.

12. The accessory assembly of claim 11, wherein the portion of the cover is coupled to the first face.

13. The accessory assembly of claim 11, further comprising a clutch positioned within the internal bore, wherein the clutch is configured to couple to a driveshaft of the accessory, and wherein the clutch is configured to selectively engage the interior surface of the accessory pulley to couple the accessory pulley to the driveshaft.

14. The accessory assembly of claim 13, further comprising the accessory.

15. The accessory assembly of claim 1, wherein the plurality of fins have a straight profile or a curved profile, and wherein the plurality of fins are configured to extend outward away from the accessory pulley or extend inward toward the accessory pulley.

16. A cover for an accessory of a machine, the cover comprising:

a flange configured to couple to a pulley of the accessory;

a sidewall extending from the flange; and a faceplate coupled to the sidewall;

wherein:

the cover is configured to extend over an aperture in a face of the pulley;

the faceplate defines a plurality of openings that extend radially outward from a central portion of the faceplate toward a peripheral edge of the faceplate in a tapered or triangular shape;

the faceplate has a plurality of fins, each of the plurality of fins extends (a) along and from an edge of a respective one of the plurality of openings at an angle and (b) at least partially across the respective one of the plurality of openings;

the plurality of openings are configured to facilitate egress of water from within the pulley through the cover;

as the cover rotates, the plurality of fins are configured to generate a first airflow that counteracts a second airflow provided by a fan of the machine to mitigate ingress of debris through the plurality of openings; and as the cover rotates, the plurality of fins are configured to generate a pressure differential across the pulley to force or pull water or debris from within the pulley and purge the water or debris therefrom through the plurality of openings.

17. A machine comprising:

a chassis;

a cab coupled to the chassis;

a hood positioned in front of the cab;

a prime mover positioned under the hood; and an accessory drive positioned under the hood, the accessory drive including:

a drive pulley coupled to the prime mover;

an accessory having a driveshaft;

a clutched pulley assembly coupled to the accessory, the clutched pulley assembly including:

an accessory pulley having a first face defining a first aperture, an opposing second face defining a second aperture, and an interior surface extending between the first aperture and the second aperture, wherein the first aperture, the second aperture, and the interior surface cooperatively define an internal bore, and wherein the driveshaft extends through the internal bore;

a clutch coupled to the driveshaft and positioned within the internal bore, the clutch configured to selectively engage the interior surface of the accessory pulley to couple the accessory pulley to the driveshaft; and a cover coupled to the first face of the accessory pulley and extending over the first aperture of the accessory pulley, the cover defining a plurality of openings spaced about the cover, the cover having a plurality of fins, each of the plurality of fins partially extending over a respective one of the plurality of openings; and a belt coupling the drive pulley to the accessory pulley.

18. The machine of claim 17, further comprising a fan positioned under the hood, wherein the fan positioned such that a first airflow generated thereby is directed toward the accessory, and wherein, as the cover rotates, the plurality of fins of the cover are configured to generate a second airflow that counteracts the first airflow to mitigate ingress of debris through the plurality of openings of the cover and into the clutched pulley assembly.

19. The machine of claim 17, wherein, as the cover rotates, the plurality of fins of the cover are configured to generate a pressure differential across the clutched pulley assembly to force or pull water or debris from within the clutched pulley assembly and purge the water or the debris therefrom through the plurality of openings, and wherein, while the cover is stationary, the plurality of openings are configured to facilitate egress of water from within the clutched pulley assembly through the cover.

* * * * *